(12) United States Patent
Nishimura et al.

(10) Patent No.: US 6,229,371 B1
(45) Date of Patent: May 8, 2001

(54) CLAMP CIRCUIT

(75) Inventors: Kouichi Nishimura; Yoshihiko Hori, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/270,209

(22) Filed: Mar. 15, 1999

(30) Foreign Application Priority Data

Mar. 18, 1998 (JP) .................................................. 10-067533

(51) Int. Cl.$^7$ ...................................................... H03K 5/08
(52) U.S. Cl. .......................... 327/309; 327/323; 327/330; 348/707
(58) Field of Search .................................. 327/309, 312, 327/313, 315, 316, 317, 321, 323, 330, 538, 543, 68, 72, 73; 348/571, 689, 690, 695, 707, 677; 330/252, 253, 260, 293

(56) References Cited

U.S. PATENT DOCUMENTS

| | | | |
|---|---|---|---|
| 4,415,929 | * 11/1983 | Yoshisato | 358/171 |
| 4,644,198 | * 2/1987 | Ahmed | 327/321 |
| 5,065,056 | * 11/1991 | Imai et al. | 327/323 |
| 5,142,354 | * 8/1992 | Suzuki et al. | 358/34 |
| 5,162,921 | * 11/1992 | Kaneko | 358/335 |
| 5,192,885 | * 3/1993 | Gay | 327/309 |
| 5,206,553 | * 4/1993 | Imai et al. | 327/321 |
| 5,663,671 | * 9/1997 | Steglich | 327/323 |
| 5,889,431 | * 3/1999 | Csanky | 327/534 |

FOREIGN PATENT DOCUMENTS

| | | |
|---|---|---|
| 62-164380 | 7/1987 | (JP) . |
| 63-283278 | 11/1988 | (JP) . |
| 3-127559 | 5/1991 | (JP) . |
| 3-175795 | 7/1991 | (JP) . |
| 3-258116 | 11/1991 | (JP) . |
| 4-314270 | 11/1992 | (JP) . |
| 5-83595 | 4/1993 | (JP) . |
| 8-204994 | 8/1996 | (JP) . |

* cited by examiner

*Primary Examiner*—Timothy P. Callahan
*Assistant Examiner*—Hai L. Nguyen
(74) *Attorney, Agent, or Firm*—Sughrue, Mion, Zinn, Macpeak & Seas, PLLC

(57) ABSTRACT

The present invention makes it possible to prevent feedback loops from causing oscillations in clamp circuits. When a video signal is input through a capacitor into a first inverting input terminal of an operational amplifier, the output terminal tends to reach a high level because the potential of the first inverting input terminal is lower than the potential of the non-inverting input terminal to which the black level reference signal is input. Thereby the NPN transistor whose base is connected to the output terminal is turned on to charge the capacitor. When the charging of the capacitor approaches completion, the potential of the first inverting input terminal becomes higher than the potential of the second inverting input terminal. Consequently, the second inverting input terminal takes priority, and the feedback loop is switched from the first feedback loop connecting the output terminal and the first inverting input terminal to the second feedback loop connecting output terminal and the second inverting input terminal. Any load-carrying capacity does not appear in the output because the capacitor is not connected to the second feedback loop, thus it becomes possible to prevent feedback loops from causing oscillations.

10 Claims, 9 Drawing Sheets

RELATIONSHIP BETWEEN PEDESTAL LEVEL AND BLACK/WHITE LEVEL OF GRAY-SCALE VIDEO SIGNAL

CLAMP CIRCUIT

BACKGROUND OF THE INVENTION

1. Field of the Invention

The present invention relates to a clamp circuit, and more particularly, to a clamp circuit for video signal processing and or the like.

2. Description of the Related Art

First, the reason why a clamp circuit is necessary for video signal processing will be explained. FIGS. 6A to 6C illustrate the relationship between a video signal and pedestal level. When the pedestal level 101 is constant as shown in FIG. 6B, the white level portion of the video signal 103 is displayed in white on the screen and the black level portion is displayed in black on the screen as shown in FIG. 6A.

If the signal is input by means of a CR (capacitance-resistance) coupling, the direct-current component is lost as shown in FIG. 6C. As a result, what should be white does not become white, resulting in an image of wrong contrast. Thus, it is necessary to provide a direct-current restorer to make the pedestal level 101 constant forcefully.

The pedestal clamp circuit for making the pedestal level 101 constant is a circuit which matches the black level 102 determined externally to the black level contained in the video signal 103.

Next, the relationship between the video signal waveform in gray scale which contains a sync signal and its voltage level will be described as a reference. FIG. 7 is a waveform diagram illustrating the relationship between the video signal waveform in gray scale which contains a sync signal and its voltage level.

If there is no sync pulse, it is sufficient to forcefully level-shift the lowest voltage inputted, to the black level provided externally.

If there is a sync pulse, it is necessary to first tune the lowest voltage inputted, to the reference potential provided externally, in order to detect this sync pulse.

Now a basic clamp circuit will be described. FIG. 8 is a circuit diagram of a conventional level clamp circuit, and FIG. 9 is a diagram showing input and output waveforms of this level clamp circuit.

FIG. 8 shows a basic system of a circuit configuration where a preset potential equals the lowest potential inputted. Such a circuit is also called a DC insertion circuit.

This level clamp circuit consists of a capacitor C, diode Di, and DC power supply (with a preset voltage Vr), wherein an input voltage Vin is input to the input side of the capacitor C and an output voltage Vout is output from the output side of the capacitor C.

The circuit configuration is such that the preset voltage Vr is clamped to the lowest voltage of the input voltage Vin. In steady state, the diode Di remains off.

Actually, however, it is clamped to a level (see FIG. 9) ΔVF lower than the lowest voltage where the diode Di does not turn on.

This ΔVF depends on the backward resistance (rb) of the diode Di, load resistance (not shown) to be connected to the output terminal Vout, forward resistance (rf) of the diode Di, etc.

Specifically, it is given by the following equation:

$$\Delta VF/(Vin-\Delta VF)=rf/rb \quad (1)$$

As can be seen from FIGS. 8 and 9, setting the desired voltage to Vr allows it to be clamped to a constant potential regardless of the duty of input waveforms.

The disadvantage of this circuit is that it is impossible to set a clamp level precisely: there is an error voltage of ΔVF with respect to Vr.

Now another conventional circuit of this type will be described. FIG. 10 is a circuit diagram of another conventional level clamp circuit. This circuit uses an operational amplifier.

The basic form of clamp circuits described earlier cannot clamp voltage accurately. To correct this situation, clamp circuits such as the one shown in FIG. 10 reduce the error in clamp voltage by inserting a diode (actually, the emitter and base of the transistor Q1 in this example) in the feedback loop 104.

Referring to FIG. 10, the clamp circuit utilizing a conventional operational amplifier consists of an operational amplifier A11 which has a black level voltage VBL applied to its non-inverting input terminal 105, a capacitor C1 which has one end connected to the inverting input terminal 106 of the operational amplifier A11 and the other end inputted a video signal 103, an NPN transistor Q1 whose base is connected to the output terminal 107 of the operational amplifier A11 and whose emitter is connected to the inverting input terminal 106 of the operational amplifier A11 and whose collector is connected to the power supply VCC, and a constant current source I1 connected between the emitter of the NPN transistor Q1 and ground. Also, an output terminal Vout is connected to the emitter of the NPN transistor Q1.

Since the emitter of the NPN transistor Q1 is connected to the inverting input terminal 106 of the operational amplifier A11, this clamp circuit results in an amplifier which generally has negative feedback. This works to equalize the voltage at the emitter (i.e., output terminal Vout) of the NPN transistor Q1 to the black level voltage VBL.

Specifically, the NPN transistor Q1 and constant current source I1 replace the difference between the pedestal voltage and black level voltage VBL of the video signal 103 with the voltage across the capacitor C1 by charging and discharging the capacitor C1, to equalize the pedestal voltage of the video signal 103 obtained at the emitter of the NPN transistor Q1 to the black level voltage VBL.

FIG. 11 is a waveform diagram representing the input-output characteristics of the clamp circuit. As shown in the figure, the ground (GND) potential of the video input signal 103 is level-shifted, in the output signal Vout, to the black level potential (VBL).

Incidentally, a circuit equivalent to this clamp circuit is disclosed in Japanese Patent Application Laid-Open No. 5-83595 (see FIG. 7 of Application No. 5-83595, in particular).

The differential amplifier 61, transistor 21, transistor 22 and resistor 34, and capacitor 42 disclosed in FIG. 7 of above-mentioned Application No. 5-83595 correspond the operational amplifier A11, transistor Q1, constant current source I1, and capacitor C1 in the example of conventional circuit (FIG. 10) herein, respectively. Also, the voltage source 71 in FIG. 7 of above-mentioned Application No. 5-83595 corresponds to the black level voltage VBL in the example of conventional circuit (FIG. 10) herein.

Other examples of clamp circuits employing operational amplifiers of this type are disclosed in Japanese Patent Application Laid-Open Nos. 62-164380, No. 8-204994, and No. 3-127559.

Besides, as examples of other clamp circuits, Japanese Patent Application Laid-Open No. 63-283278 discloses a clamp circuit which corrects line level variations by feeding back its output to an inverting input terminal and using the feedback loop as an integrator with a switchable filter inserted in the feedback loop. Japanese Patent Application Laid-Open No. 3-175795 discloses a feedback clamp system which shortens the time required for a feedback loop to stabilize, by feeding back the output of a clamp circuit to the input of the clamp circuit via an error detection circuit and then temporarily opening the feedback loop in initial states such as at power-on and bringing, instead, the reference voltage of the clamp circuit close to a set point. Japanese Patent Application Laid-Open No. 3-258116 discloses a gain control circuit which corrects variations in the signal level of input signals in a stable and reliable manner by comprising a feedback loop for feeding back the output of a clamp circuit to the input side of the clamp circuit through an A/D (analog-digital) converter and clamp level control circuit, as well as a feedback loop for feeding back the output of the A/D converter to the input side of the A/D converter through an amplitude control circuit, and by giving priority to the operation of the clamp level control circuit over the operation of the amplitude control circuit. Japanese Patent Application Laid-Open No. 4-314270 discloses a clamp circuit which secures an equal output voltage in clamp mode, video mode during normal operation, and feedback erase mode by comprising a first feedback loop wherein the output of an amplifier is input to an operational amplifier and the output of the operational amplifier is fed back to the input side of the amplifier, a second feedback loop wherein the output of the operational amplifier is fed back to the input side of the operational amplifier itself, and a switch for cutting off the first and second feedback loops selectively.

The conventional clamp circuits described above, however, have a disadvantage that there is a high possibility of oscillations due to reduced phase margin for their feedback loops.

Phase margin is a loop transfer function for stable feedback control. It is equal to 180 degrees minus the absolute value of the loop's phase angle at the frequency at which the loop gain is 1. Therefore, its unit is the degree.

Such a small phase margin and high possibility of oscillations result from the fact that the DC blocking capacitor (for example, the capacitor C1 in FIG. 10), which is connected to the output terminal Vout, appears to be at load-carrying capacity.

Since the conditions for phase margin of loop (for example, loop 104 in FIG. 10) gain is severe for the capacitive load of an amplifier (for example, the operational amplifier A11 in FIG. 10), the phase margin for the feedback loops is reduced, resulting in oscillations.

SUMMARY OF THE INVENTION

The purpose of the present invention is to provide a clamp circuit capable of preventing feedback loops from causing oscillations in the clamp circuit.

To achieve the above purpose, the present invention provides a means of operational amplification comprising a first and second inverting input terminal wherein the signal with the lower potential is input preferentially, a non-inverting input terminal, and an output terminal. A first means of rectification connected between the output terminal and the first inverting input terminal, a second means of rectification connected between the output terminal and the second inverting input terminal; and a capacitive element which has one end connected to the first inverting input terminal is also provided. A signal is input to the other end of the capacitive element, a signal of a constant potential is input to the non-inverting input terminal, and a signal is output from the one end of the capacitive element.

According to the present invention, the capacitive element is charged with a signal inputted to the means of operational amplification, and the second inverting input terminal is selected when the voltage of the first inverting input terminal connected with the capacitive element becomes higher than the voltage of the second inverting input terminal.

More precisely, the feedback loop formed by the output terminal and the first inverting input terminal connected with the capacitive element remains selected until the capacitive element has been charged, but when the charging of the capacitive element is completed, the feedback loop formed by the output terminal and the second inverting input terminal not connected with the capacitive element is selected.

Since the capacitive element for DC blocking no longer appears to be a load-carrying capacity in the feedback loop with the capacitive element fully charged (in the steady state), the phase margin of the loop gain for the capacitive load of the means of operational amplification increases.

This makes it possible to prevent the feedback loops in the clamp circuit from causing oscillations.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

DESCRIPTION OF THE PREFERRED EMBODIMENTS

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to avoid unnecessarily obscure of the present invention.

Figure 1:
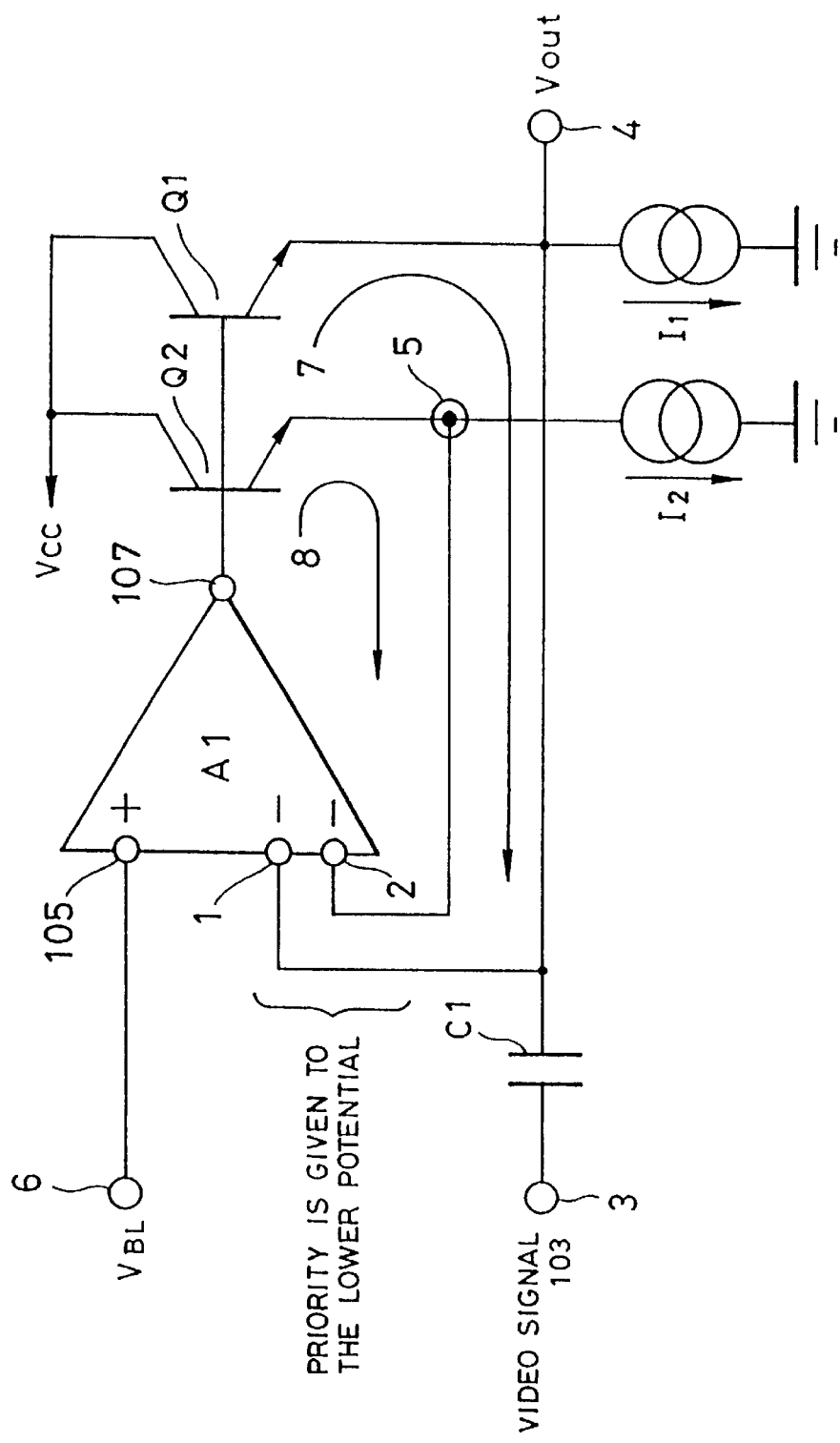
FIG. 1 is a circuit diagram of the first embodiment of the clamp circuit according to the present invention.
Figure 10:
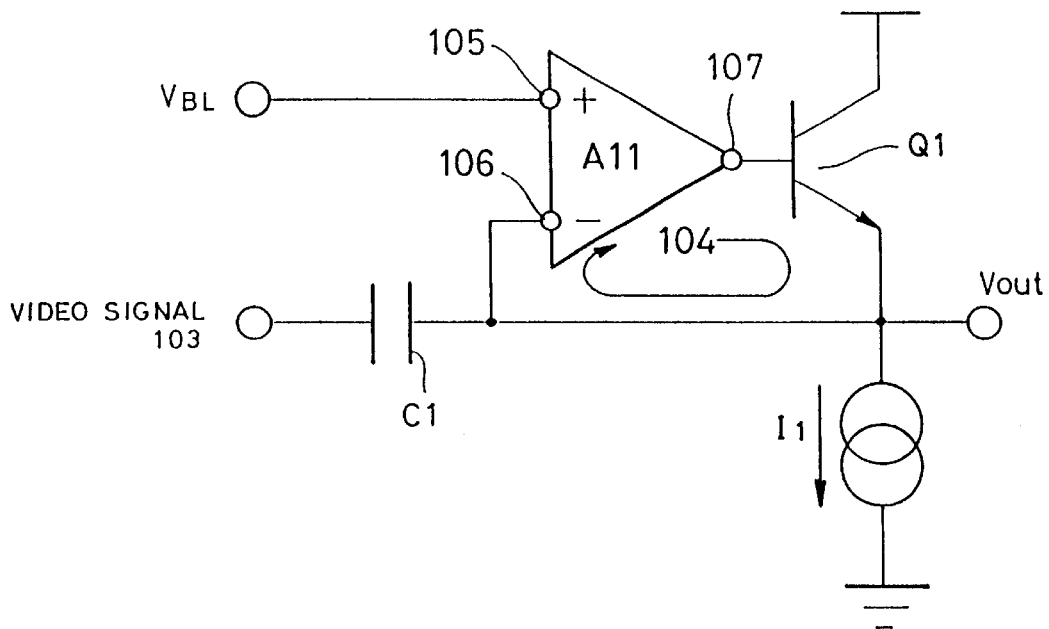
FIG. 10 is a circuit diagram of another conventional level clamp circuit.
Figure 11:
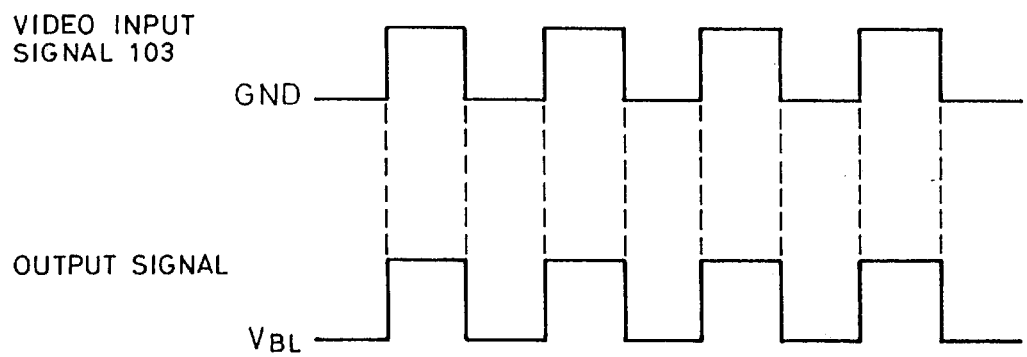
FIG. 11 is a waveform diagram representing the input-output characteristics of this clamp circuit.

The embodiments of the present invention will now be described in detail with reference to the accompanying drawings. The first embodiment will be described first. FIG. 1 is a circuit diagram of the first embodiment of the clamp circuit according to the present invention. In the following figures, those components that have similar functions as those in the conventional circuit (shown in FIG. 10) are designated with the same reference numbers and descriptions thereof are omitted.

The clamp circuit consists of an operational amplifier Al, NPN transistors Q1 and Q2, a capacitor C1, and current sources I1 and I2.

A voltage VBL that corresponds to the black level of the video signal 103 is input to the non-inverting input terminal 105 of the operational amplifier Al, and the bases of the NPN transistors Q1 and Q2 are commonly connected to the output terminal 107 of the operational amplifier Al.

The distance between the emitter of the NPN transistor Q1 and the first inverting input terminal 1 of the operational amplifier A1 is shorted and the distance between the emitter of the NPN transistor Q2 and the second inverting input terminal 2 of the operational amplifier A1 is shorted.

One end of the capacitor C1 is connected to the first inverting input terminal 1, the current source I1 is connected to the emitter of the NPN transistor Q1, and the current source I2 is connected to the emitter of the NPN transistor Q2.

The collectors of the NPN transistors Q1 and Q2 are commonly connected to the power supply VCC.

The other side of the capacitor C1 is connected to the input terminal 3 while the emitters of the NPN transistors Q1 and Q2 are connected to the first output terminal 4 and second output terminal 5, respectively.

The operation of the clamp circuit will now be described. A voltage VBL which corresponds to the black level of the video signal 103 is input to the non-inverting input terminal 105 of the operational amplifier A1.

Now the operation of the clamp circuit immediately upon power-on will be discussed. Transitionally, the voltage at the first inverting input terminal 1 of the operational amplifier A1 connected to one end of the capacitor C1 is lower than the voltage VBL inputted to the non-inverting input terminal 105, so the output from the first output terminal 4 tends to go high.

Since the base of the NPN transistor Q1 goes high, the NPN transistor Q1 is turned on and consequently the capacitor C1 is charged through the emitter terminal of the NPN transistor Q1. As a result, a first feed back loop 7 is formed.

The emitter of the NPN transistor Q1, i.e., the first inverting input terminal 1 of the operational amplifier A1 tends to enter a virtual-short state with the non-inverting input terminal 105. In other words, the voltage at one end of the capacitor C1 tends to be equal to the voltage VBL of the non-inverting input terminal 105.

When the charging of the capacitor C1 is completed eventually, the voltage at the output terminal 107 of the operational amplifier A1 goes low and consequently the NPN transistor Q1 is almost turned off.

As a result, the current flowing previously from the collector of the NPN transistor Q1 to the constant current source I1 through the emitter begins to flow from the capacitor C1 to the constant current source I1.

At this time, the signal outputted from the first output terminal 4 becomes the video signal 103 whose lowest level is level-shifted to the black level voltage VBL.

This means that the video signal 103 inputted to the input terminal 3 is output from the first output terminal 4 after being level-shifted a voltage equal to the voltage VBL.

On the other hand, the voltage at the second inverting input terminal 2 commonly connected to the emitter of the NPN transistor Q2 and the second constant current source I2 is always compared with the voltage at the first inverting input terminal 1 and the lower voltage takes priority.

As the charging of the capacitor C1 approaches completion, the voltage at the second inverting input terminal 2 becomes lower than the voltage at the first inverting input terminal 1. Therefore, the second inverting input terminal 2 is given priority and eventually a second feedback loop 8 is formed between the second inverting input terminal 2 and the emitter of the NPN transistor Q2.

Since the capacitor C1 is not connected to the feedback loop 8 formed eventually, the load-carrying capacity C1 does not appear in the output.

This means that the phase margin for the feedback loop can be increased dramatically, thus making it is possible to prevent the feedback loops from causing oscillations.

Figure 5:
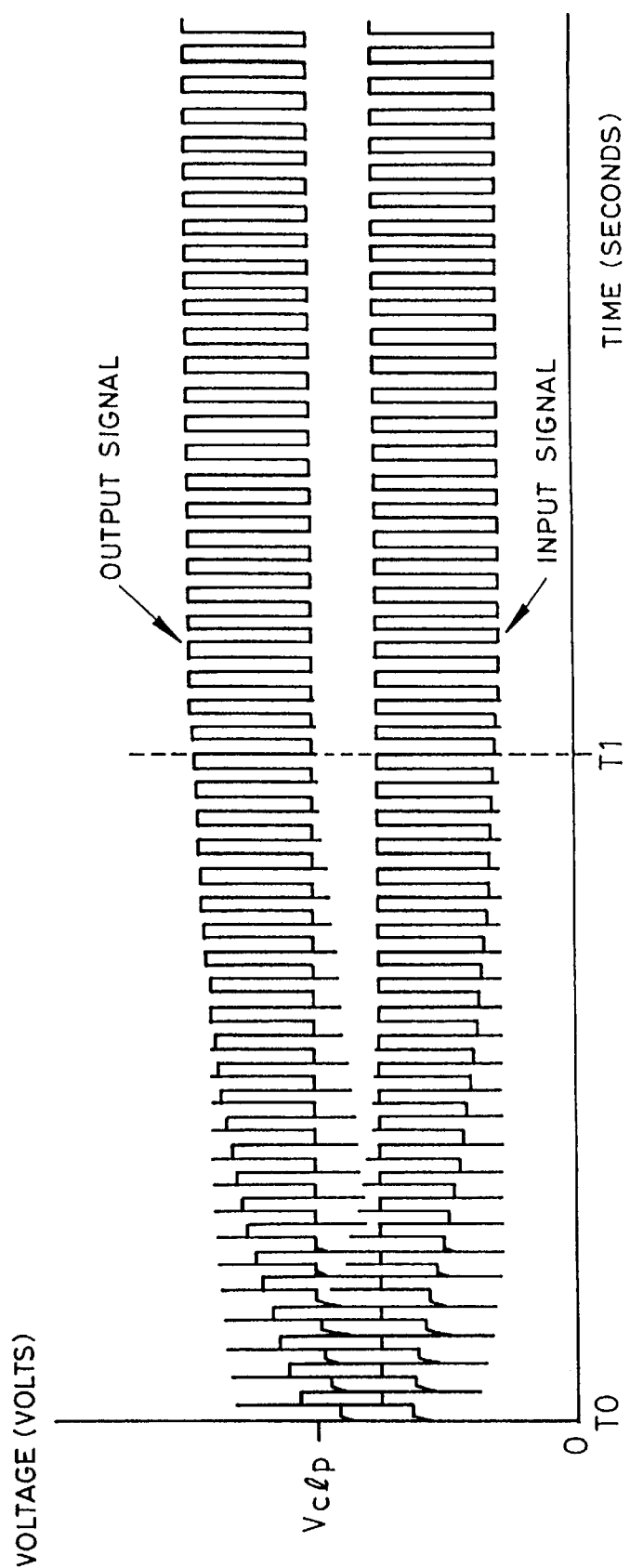
FIG. 5 is a diagram showing the input-output characterisics of the clamp circuit.
Figure 6:
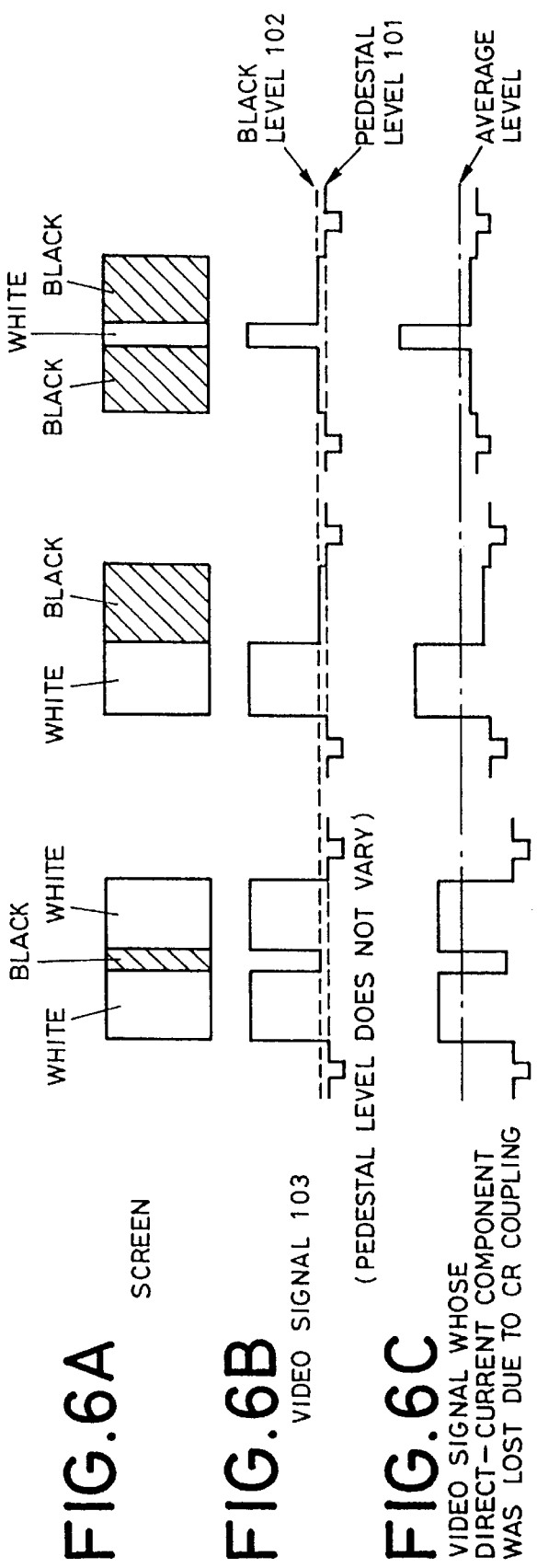
FIGS. 6a–6c is diagrams illustrating the relationship between a video signal and pedestal level.
Figure 7:
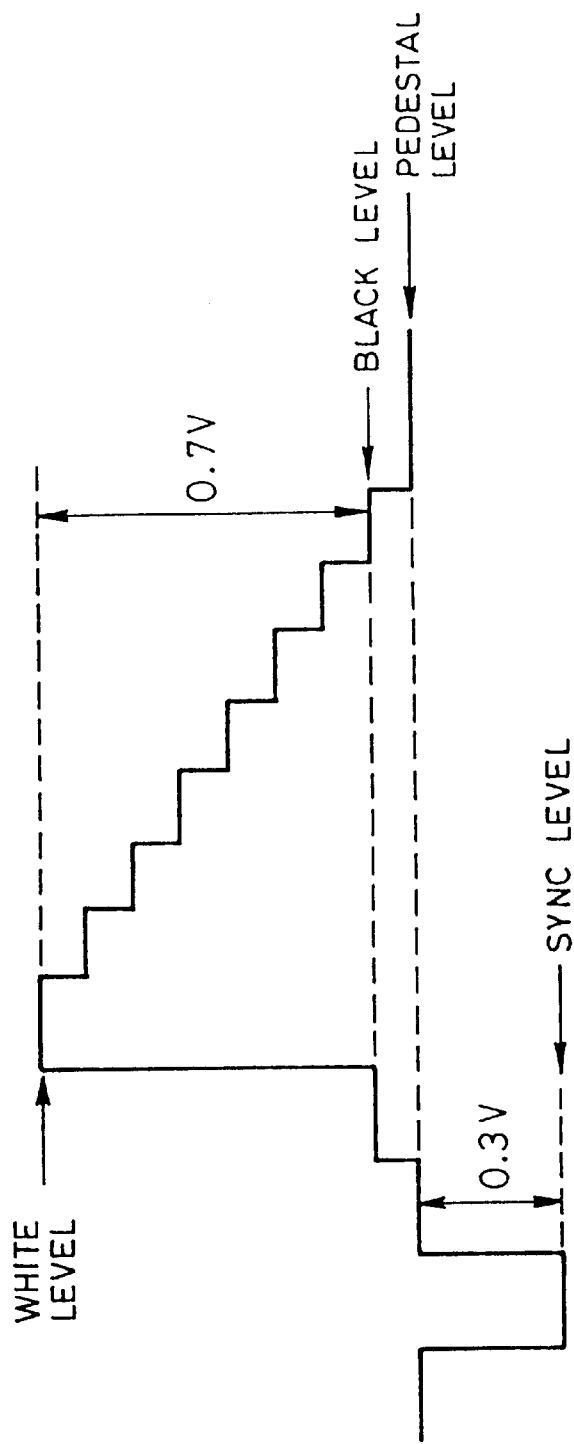
FIG. 7 a waveform diagram illustrating the relationship between a video signal waveform in gray scale which contains a sync signal and its voltage level.
Figure 8:
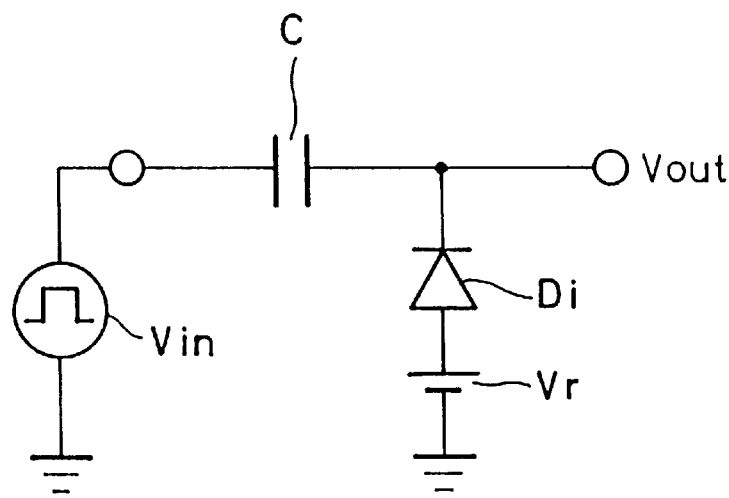
FIG. 8 is a circuit diagram of a conventional level clamp circuit.
Figure 9:
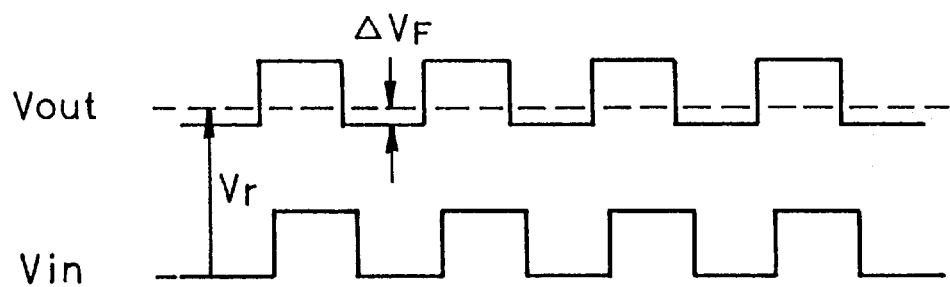
FIG. 9 is a diagram showing input and output waveforms of this level clamp circuit.

The input-output characteristics of this clamp circuit is shown in FIG. 5. The horizontal axis of the diagram represents time (unit: seconds) while the vertical axis represents voltage (unit: volts).

As shown in the figure, the lowest level of the output signal rises gradually from power-on (time T0) to time T1, but it is fixed at the clamp voltage Vclp after time T1. The period from T0 to T1 represents a transient state in which the capacitor C1 is charged while the period after time T1 represents a steady state in which the capacitor C1 is fully charged.

Figure 2:
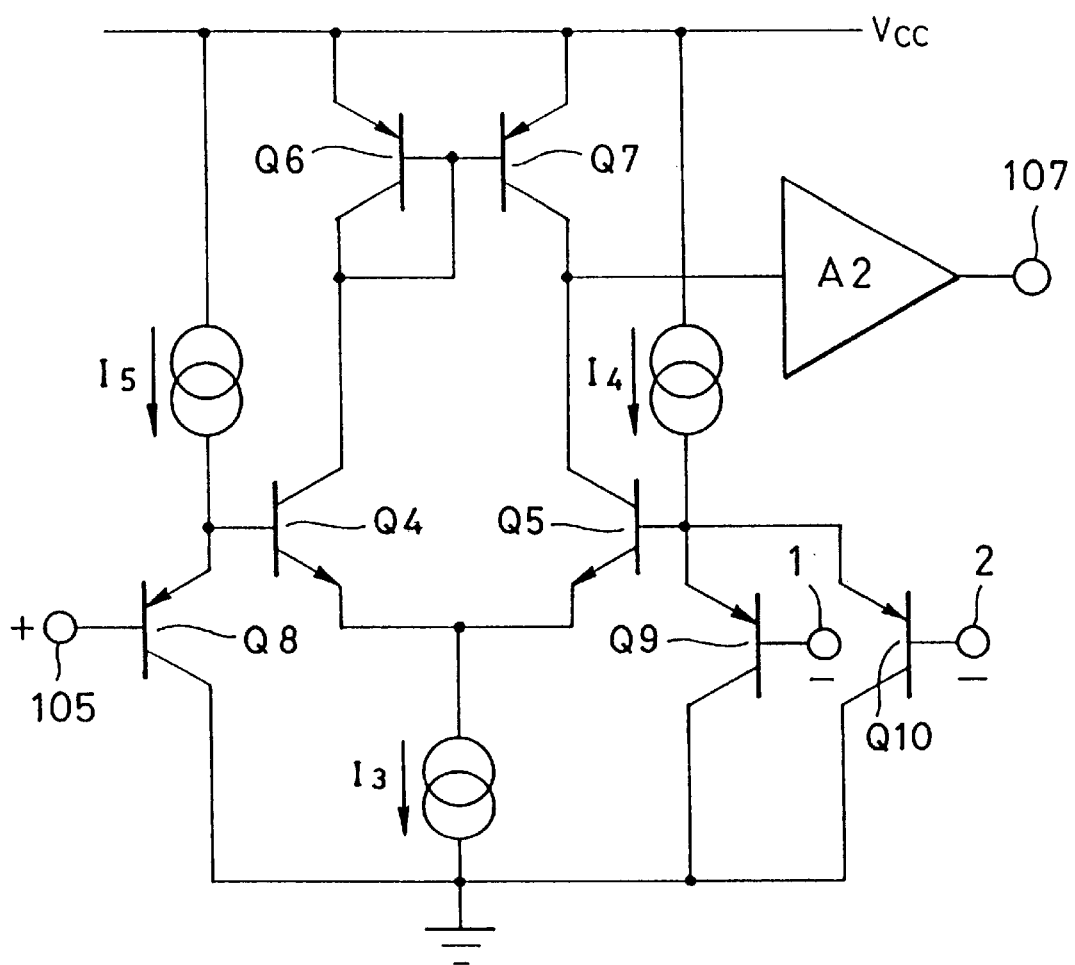
FIG. 2 is a circuit diagram of the operational amplifier A1.

Now the circuit configuration of the operational amplifier A1 will be described. FIG. 2 is a circuit diagram of the operational amplifier A1. Those terminals that are similar to those in FIG. 1 are designated with the same reference numbers and descriptions thereof are omitted.

This operational amplifier A1 comprises a first differential amplifier composed of NPN transistors Q4 and Q5, a second differential amplifier composed of PNP transistors Q8 and either of Q9 or Q10, a current mirror circuit composed of PNP transistors Q6 and Q7, an amplifier A2, and constant current sources I3 to I5.

The collectors of the PNP transistor Q6 and NPN transistor Q4 are connected to each other and the collectors of the PNP transistor Q7 and NPN transistor Q5 are connected to each other. Besides, the collector and base of the PNP transistor Q6 are shorted.

The collector of the NPN transistor Q5 is connected with the input side of the amplifier A2. The output side of the amplifier A2 is connected with the output terminal 107.

The base of the NPN transistor Q5 is connected with the emitters of the PNP transistors Q9 and Q10.

The base of the NPN transistor Q4 is connected with the emitter of the PNP transistor Q8. The collectors of the PNP transistors Q8, Q9, and Q10 are grounded.

The emitters of the NPN transistors Q4 and Q5 are connected commonly. The constant current source I3 is connected between the emitter of the NPN transistor Q4 and ground, the constant current source I5 is connected between the power supply VCC and the base of the NPN transistor Q4, and the constant current source I4 is connected between the power supply VCC and the emitter of the PNP transistor Q9.

The emitters of the PNP transistors Q6 and Q7 are connected to the power supply VCC.

Then the base of the PNP transistor Q8 is connected to the non-inverting input terminal 105, the base of the PNP transistor Q9 is connected to the first inverting input terminal 1, and the base of the PNP transistor Q10 is connected to the second inverting input terminal 2.

Thus, the non-inverting input terminal 105 of the operational amplifier A1, first inverting input terminal 1, second inverting input terminal 2, and output terminal 107 in FIG. 1 are configured as the non-inverting input terminal 105, first inverting input terminal 1, second inverting input terminal 2, and output terminal 107 in FIG. 2.

Now the operation of this circuit will be described. The second differential amplifier consisting of the PNP transistors Q8 to Q10 has one non-inverting input terminal (105) and two inverting input terminals (1 and 2).

Of the voltages applied to the inverting input terminals 1 and 2, the lower one takes priority and the PNP transistor (Q9 or Q10) to which the lower voltage is input is activated.

More precisely, if the voltage applied to the inverting input terminal 1 is lower than the voltage applied to the inverting input terminal 2, the collector current of the PNP transistor Q9 becomes higher than the collector current of the PNP transistor Q10, turning on the PNP transistor Q9 and turning off the PNP transistor Q10. Consequently, the PNP transistors Q8 and Q9 form a differential amplifier circuit.

On the other hand, if the voltage applied to the inverting input terminal 2 is lower than the voltage applied to the inverting input terminal 1, the collector current of the PNP transistor Q10 becomes higher than the collector current of the PNP transistor Q9, turning on the PNP transistor Q10 and turning off the PNP transistor Q9. Consequently, the PNP transistors Q8 and Q10 form a differential amplifier circuit.

Figure 3:
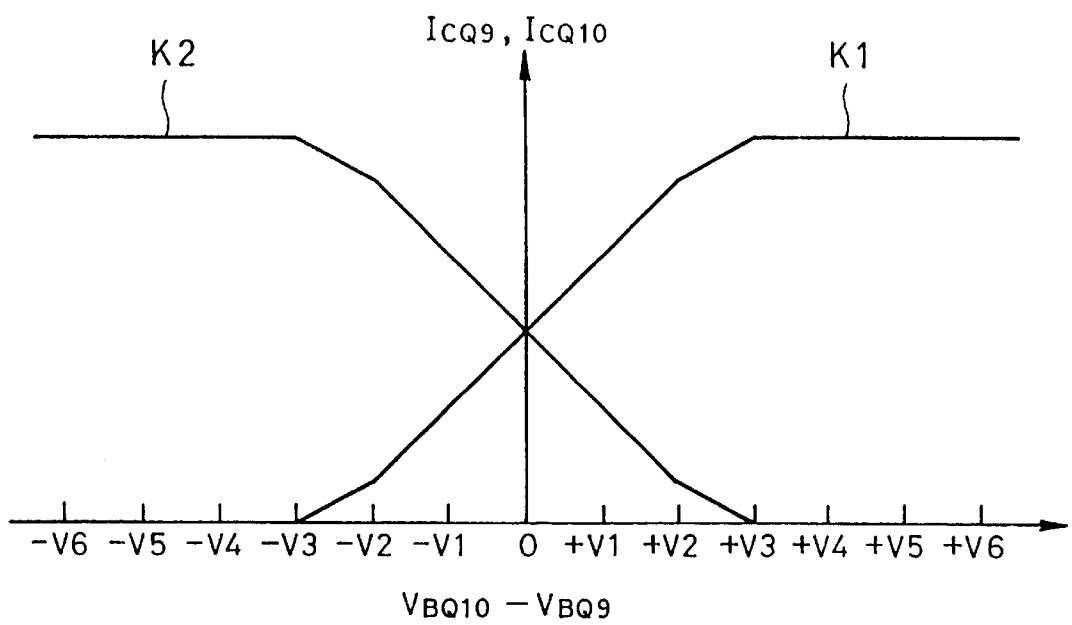
FIG. 3 is a characteristic diagram of the base differential voltage versus collector currents representing the operation of the transistors Q9 and Q10.

The operation of the two transistors are shown in detail in FIG. 3, which is a characteristic diagram of the base differential voltage vs. collector currents representing the operation of the transistors Q9 and Q10.

In the figure, the horizontal axis represents the differential voltage (VBQ10–VBQ9) between the voltage VBQ9 applied to the base of the PNP transistor Q9 and voltage VBQ10 applied to the base of the PNP transistor Q10 while the vertical axis represents the collector currents of the PNP transistors Q9 and Q10.

In the figure, the curve K1 represents the collector current ICQ9 of the PNP transistor Q9 while the curve K2 represents the collector current ICQ10 of the PNP transistor Q10.

When the differential voltage is positive, it means that the base of the PNP transistor Q9 is lower than that of the PNP transistor Q10, and when the differential voltage is negative, it means that the base of the PNP transistor Q10 is lower than that of the PNP transistor Q9.

As can be seen from the figure, when the differential voltage is –V3, the PNP transistor Q10 is fully turned on (see K2) and the PNP transistor Q9 is fully turned off (see K1).

As the differential voltage approaches 0 (zero), the collector current ICQ10 of the PNP transistor Q10 decreases and the collector current ICQ9 of the PNP transistor Q9 increases.

When the differential voltage is 0 (zero), the collector currents ICQ9 and CQ10 of the PNP transistors Q9 and Q10 become equal. When it reaches +V3, the PNP transistor Q9 is fully turned on and the PNP transistor Q10 is fully turned off.

In this way, the collector currents of the PNP transistors Q9 and Q10 change with the magnitude of the differential voltage. When the differential voltage reaches ±V3, one of the transistors is fully turned on and the other is fully turned off.

A circuit where the input with the lower voltage takes priority over the other input is described in Japanese Patent Publication No. 5-054630 filed by the present applicant.

Once a differential amplifier has been formed by the PNP transistor Q8 and either of the PNP transistors Q9 or Q10 through the above-mentioned process, the output from the differential amplifier is further amplified through the differential amplifier formed by the NPN transistors Q4 and Q5, converted into a single-ended output through the current mirror circuit formed by the PNP transistors Q6 and Q7, and then output to the next amplifier A2.

The signal inputted to the amplifier A2 is amplified by the amplifier A2 and then output from the output terminal 107.

Incidentally, an example of a differential amplifier circuit containing a current mirror circuit of this type is described in Japanese Patent Publication No. 59-102089 (FIG. 3 of Publication No. 59-102089 in particular) filed by the present applicant.

Figure 4:
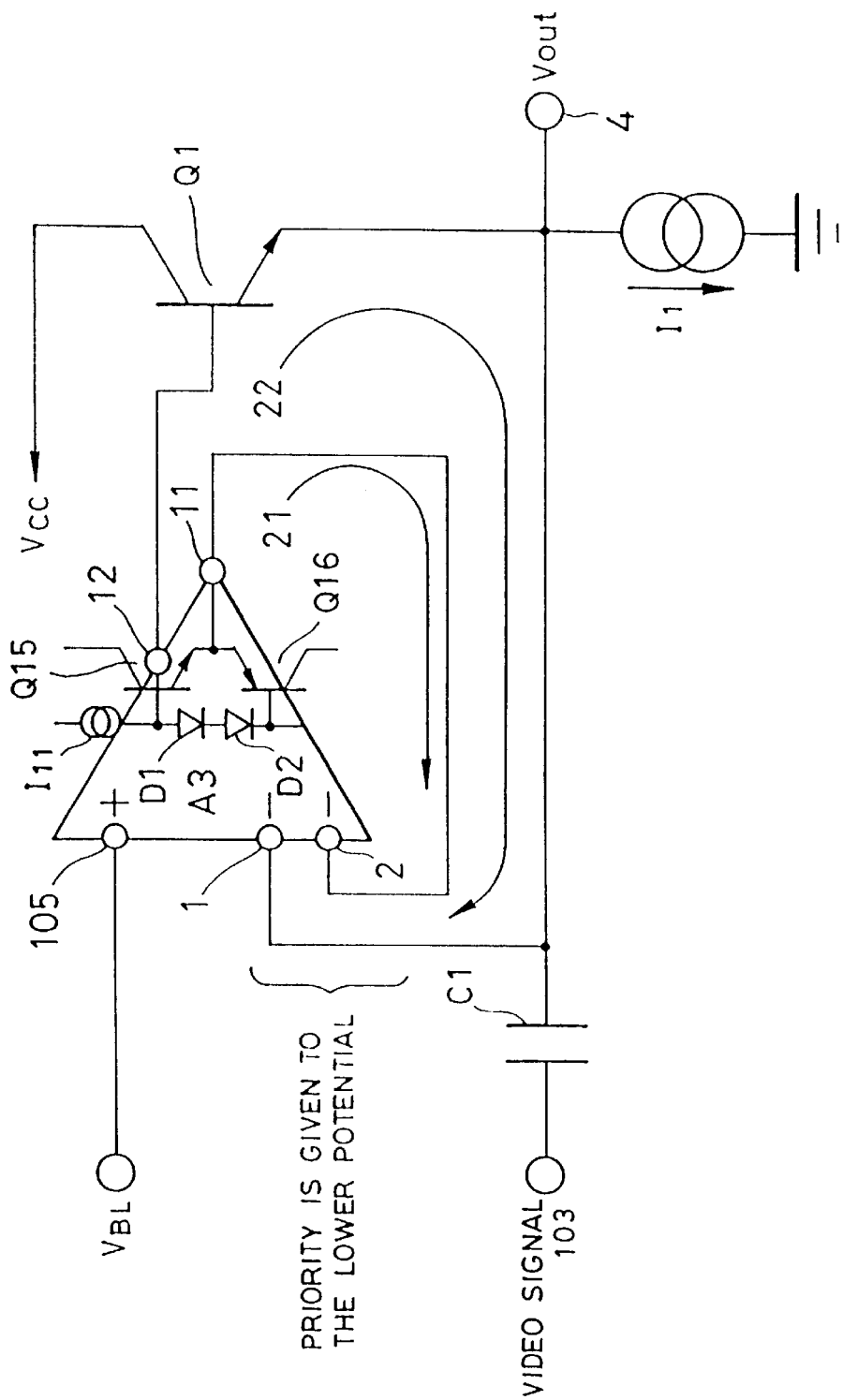
FIG. 4 is a circuit diagram of the second embodiment of the clamp circuit according to the present invention.

Now a second embodiment will be described. FIG. 4 is a circuit diagram of the second embodiment of the clamp circuit according to the present invention. Those components that are similar to those in FIG. 1 are designated with the same reference numbers and descriptions thereof are omitted.

This clamp circuit consists of an operational amplifier A3, NPN transistor Q1, capacitor C1, and current source I1.

The output side of the operational amplifier A3 has a push-pull arrangement where an NPN transistor Q15 and PNP transistor Q16 form a Class AB output stage.

The emitter of the NPN transistor Q15 and the emitter of the PNP transistor Q16 are connected to each other and the junction point is connected to a second output terminal 11.

The second output terminal 11 and a second inverting input terminal 2 are shorted. Diodes D1 and D2 are connected in series between the bases of the transistors Q15 and Q16. Also, the base of the NPN transistor Q15 is connected through a first output terminal 12 to the base of the NPN transistor Q1.

Furthermore, the base of the NPN transistor Q15 is connected with a constant current source I11. The connections of other terminals are omitted.

In short, the present clamp circuit uses this push-pull circuit to amplify the signals inputted to it.

This push-pull circuit constitutes the output section of the operational amplifier A2 shown in FIG. 2. Thus, it can be thought that the output of the operational amplifier A2 in FIG. 2 is amplified by this push-pull circuit.

More particularly, the output of the operational amplifier A2 is input to the base of the NPN transistor Q15 while the inverted output of the operational amplifier A2 is input to the base of the PNP transistor Q16. Then outputs are obtained from the common connection (output terminal 11) of the emitters of the NPN transistor Q15 and PNP transistor Q16 as well as from the base of the NPN transistor Q15.

Now the overall configuration of the circuit will be described in detail. The emitter of the NPN transistor Q1 is connected to the current source I1 and the collector is connected to the power supply VCC.

One end of the capacitor C1 is commonly connected to the first inverting input terminal 1 of the operational amplifier A3, emitter of the NPN transistor Q1, and current source I1.

A voltage VBL which corresponds to the black level of the video signal 103 is input to the non-inverting input terminal 105 of the operational amplifier A3, the video signal 103 is input to the other end of the capacitor C1, and an output signal is output from the output terminal 4.

Now the operation of the circuit will be described. The operation of this second embodiment is similar to that of the first embodiment.

A loop without any capacitor C1 is formed through a feedback loop 21 connecting the second output terminal 11 and second inverting input terminal 2 of the operational amplifier A3 while a loop connected with the capacitor C1 is formed through a feedback loop 22 connecting the first output terminal 12, NPN transistor Q1, and first inverting input terminal 1.

The feedback loop 22 is enabled until the capacitor C1 as been charged and the feedback loop 21 is enabled after he capacitor C1 has been fully charged.

What distinguishes this clamp circuit is that it does not need a constant current source I2 unlike the first embodiment and that it is sufficient to short the second inverting input terminal 2 and second output terminal 11 of the operational amplifier A3.

Whereas conventional clamp circuits have a phase margin of 18 degrees, the clamp circuit according to the present invention has a phase margin of 64 degrees, an improvement of as much as 46 degrees.

The clamp circuit according to the present invention comprises the means of operational amplification composed of the first and second inverting input terminals to which the signal with the lower potential is input preferentially, non-inverting input terminal, and output terminal; the first means of rectification connected between said output terminal and said first inverting input terminal; the second means of rectification connected between said output terminal and said second inverting input terminal; and the capacitive element which has one end connected to said first inverting input terminal; wherein a signal is input to the other end of said capacitive element, a signal of a constant potential is input to said non-inverting input terminal, and a signal is output from said one end of said capacitive element, making it possible to prevent the feedback loops in the clamp circuit from causing oscillations.

When a signal is input to the other end of the capacitive element, the capacitive element is charged, raising the voltage of first inverting input terminal which is connected with the first end of the capacitive element. The feedback loop formed by the output terminal and the first inverting input terminal connected with the capacitive element remains selected until the capacitive element has been charged.

However, when the voltage of the first inverting input terminal becomes higher than the voltage of the second inverting input terminal, the second inverting input terminal takes priority and consequently the feedback loop formed by the output terminal and the second inverting input terminal not connected with the capacitive element is selected.

Since any capacitive element is not connected to the feedback loop after the completion of the capacitor charge, the load-carrying capacity does not appear in the output. Consequently this increases the phase margin of the loop gain with respect to the capacitive load of the operational amplifying means.

Therefore, it is possible to prevent the feedback loops from causing oscillations.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A clamp circuit comprising:

operational amplifying means including first and second inverting input terminals to which a signal with a low potential is input preferentially, a non-inverting input terminal, and an output terminal;

first rectifying means connected between said output terminal and said first inverting input terminal;

second rectifying means connected between said output terminal and said second inverting input terminal; and a capacitive element which has one end connected to said first inverting input terminal;

wherein a second signal is input to the other end of said capacitive element, and a third signal of a constant potential is input to said non-inverting input terminal, and a fourth signal is output from said one end of said capacitive element.

2. The clamp circuit according to claim 1, wherein said first rectifying means has a first NPN transistor and a first current source, and the base of said first NPN transistor is connected to the output terminal of said operational amplifying means, and the collector of said first NPN transistor is connected to a power supply, and the emitter of said first NPN transistor is connected to said first current source, said first inverting input terminal, and said one end of said capacitive element, and said second rectifying means has a second NPN transistor and a second current source, and the base of said second NPN transistor is connected to the output terminal of said operational amplifying means, and the collector of said second NPN transistor is commonly connected with the collector of said first NPN transistor, the emitter of said second NPN transistor is connected to said second current source and said second inverting input terminal.

3. A clamp circuit comprising:

operational amplifying means including first and second inverting input terminals to which a signal with a low potential is input preferentially, a non-inverting input terminal, and an output section formed by a pair of complementary transistors connected in a push-pull fashion, the control terminal of one of said complementary transistors being connected to a first output terminal, the common connection of said complementary transistors connected to a second output terminal, and said first and second output terminals being shorted to said first and second inverting input terminals;

rectifying means connected between said first output terminal and said first inverting input terminal; and a capacitive element having one end connected to said first inverting input terminal, wherein a second signal is input to the other end of said capacitive element, and a third signal of a constant potential is input to said non-inverting input terminal, and a fourth signal is output from said one end of said capacitive element.

4. The clamp circuit according to claim 3, wherein said rectifying means consists of an NPN transistor and a constant current source, and the base of said NPN transistor is connected to said first output terminal of said operational amplifying means, and the collector of said NPN transistor is connected to a power supply, and the emitter of said NPN transistor is connected to said constant current source, said one end of said capacitive element, and said first inverting input terminal.

5. The clamp circuit according the claim 1, wherein said operational amplifying means includes a differential amplifier for amplifying a difference in input voltage between at least one of said first and second inverting input terminals and said non-inverting input terminal, an active load for converting the output of said differential amplifier into a single-ended output, and an amplifier for amplifying the output of said active load; the output of said amplifier is connected to said output terminal of said operational amplifying means.

6. The clamp circuit according to claim 5, wherein said active load is a current mirror circuit.

7. The clamp circuit according to claim 1, wherein an inverting input section of said operational amplifying means consists of a common connection of emitters and a common connection of collectors of two PNP transistors, and said common connection of said emitters is connected to a constant current source, and said common connection of said collectors is grounded, and the base of said PNP transistors are connected to said first and second inverting input terminals respectively.

8. The clamp circuit according to claim 1, wherein a lowest potential of the signal inputted to the other end of said capacitive element is lower than a potential of the signal inputted to said non-inverting input terminal.

9. The clamp circuit according to claim 1, wherein the signal inputted to the other end of said capacitive element is a video signal and the signal inputted to said non-inverting input terminal is a black level signal of a video.

10. The clamp circuit according to claim 3, wherein said complementary transistors of a push-pull arrangement form a Class AB output stage.

* * * * *